W. D. Grimshaw,

Shearing Metals.

No. 110,354. Patented Dec. 20, 1870.

Witnesses:
Fred. Hayne
R. R. Raburn

William D. Grimshaw

United States Patent Office.

WILLIAM D. GRIMSHAW, OF NEWARK, NEW JERSEY.

Letters Patent No. 110,354, dated December 20, 1870.

IMPROVEMENT IN MACHINES FOR CUTTING SHEET METAL TO AN OVAL FORM.

The Schedule referred to in these Letters Patent and making part of the same.

*To all whom it may concern:*

Be it known that I, WILLIAM D. GRIMSHAW, of Newark, in the county of Essex and State of New Jersey, have invented a new and useful Improvement in Machines for Cutting Oval and other Curved Forms in Sheet Metal and other substances; and I do hereby declare that the following is a full, clear, and exact description, reference being had to the accompanying drawing forming part of this specification, and in which—

Figure 1:
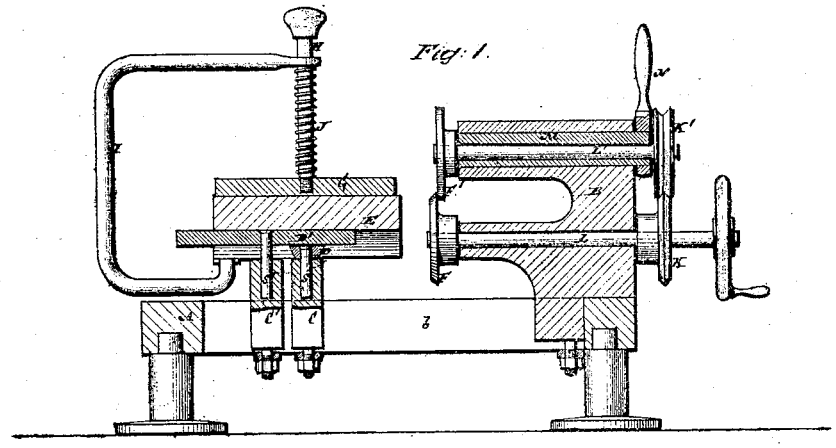
Figure 2:
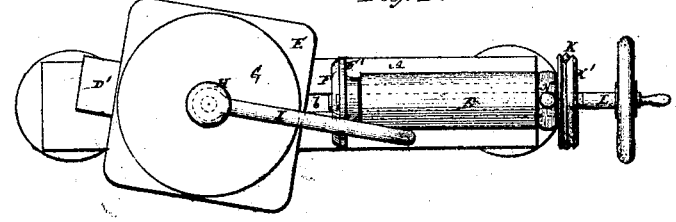

Figure 1 represents a sectional side elevation of a machine for cutting ovals and other curved forms, constructed in accordance with my invention;

Figure 2, a plan of the same; and

Figure 3:
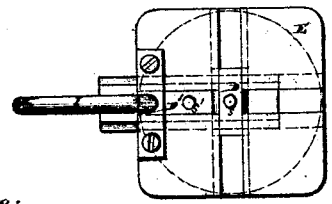

Figure 3, an inverted plan of the revolving plate-carrying block or table with its cross-slides.

Similar letters of reference indicate corresponding parts.

My invention consists in a novel arrangement within or under the revolving plate-carrying block or table of the cross-slides in different planes, whereby said slides with their center-pins are made capable of crossing each other and of working in closer relation as regards their center-pins, which enlarges the capacity of the machine and allows of ovals being cut, the major axes of which more closely approximate the minor axes thereof than is attainable by an arrangement of said slides in the same plane as heretofore adopted.

The invention also includes an advantageous construction and arrangement of the clamp for holding the plate on the working-table and between it and a revolving disk attached to the clamp.

Likewise, a novel construction or combination of parts for simultaneously releasing, when required, the shears from contact with each other, and the operating or driving-wheels of the shears from gear, the one with the other.

In the accompanying drawing—

A represents the bed of the machine, formed with a longitudinal slot, $b$, in it, for adjustment along it, relatively to each other and to the headstock B that carries the shears of the bearings C C′, in which the pins $s\ s'$ of the cross-slides D D′ work, said slides being arranged within the plate-carrying block or table E, and serving, when the table is revolved, to secure, as in other machines, to the plate its necessary movements, which will insure a cut of oval or other curved shape being made in it by the action of the revolving shears F F′, as said plate, in the turning of the table E, is passed between the shears.

But, instead of arranging these slides D D′, as heretofore, in the same plane, so that the one cannot cross the other, I arrange them in different planes, or the one above the other, whereby they may be crossed to opposite sides of each other, and be made capable of working in closer relation to one another as regards their pivots or center pins $s\ s'$, which enlarges the capacity of the machine and allows of ovals being cut, the major axes of which more closely approximate in length the minor axes thereof.

Other curved forms than ovals may be cut by the machine and only one or both slides D D′ be used, it being practicable to cut circles or parts of circles, as well as ovals or different irregular figures by the same machine; but it will suffice to restrict this description to the cutting of ovals.

The plate is held on the table E by a spring-pressure clamp, composed of a disk, G, carried by a lifting-rod, H, which is free to turn in a cranked brace or arm, I, secured at its lower end to the table E, and said rod H, having the spring J, which gives the necessary pressure to the clamp, wound around it.

This constitutes at once a simple and effective clamp, and allows of the introduction and adjustment of the plate on the table E, or between it and the holding-down and revolving disk G, without offering any impediment or hindrance, and allowing of the full sweep of the table to secure the cutting of the complete figure free from interference by the clamp with the headstock B.

The revolving shears F F′ are driven by friction or other gears K K′ arranged on the outer ends of their shafts L L′, any suitable driving-power being applied to the one shaft L, which has a fixed bearing in the headstock B, while the other shaft L′ turns in a sleeve or bearing, M, of eccentric construction, made capable of adjustment within said headstock, and which may be turned as required by means of a handle, N.

By this construction of the parts not only may the one shear F′ be stopped while the other shear is free to revolve by turning the eccentric so as to throw the gear K′ out of contact with the gear K, but, in so doing, the two shears F and F′ are simultaneously thrown out of working contact with each other, which prevents wear and affords greater convenience in the handling and adjustment of the plate.

What is here claimed, and desired to be secured by Letters Patent, is—

1. The arrangement of the pin-carrying slides D D′ within the table E in different planes, whereby they are enabled to cross each other, substantially as specified.

2. The combination, with the table E, of the pressure-clamp, composed of the cranked brace or arm I, the lifting-rod H, and the disk G, the whole arranged to be capable of turning, essentially as herein described.

3. The combination of the eccentric sleeve or bearing M, with the shears F F′ and friction-wheels K K′, or other gears, substantially as specified.

WILLIAM D. GRIMSHAW.

Witnesses:
 FRED. HAYNES,
 R. E. RABEAU.